United States Patent [19]
Zhao

[11] Patent Number: 6,081,840
[45] Date of Patent: Jun. 27, 2000

[54] TWO-LEVEL CONTENT DISTRIBUTION SYSTEM

[76] Inventor: Yan Zhao, 12135 Fulton Estates Ct., Fulton, Md. 20759

[21] Appl. No.: 08/949,449

[22] Filed: Oct. 14, 1997

[51] Int. Cl.[7] .................................................. G06F 15/163
[52] U.S. Cl. ........................... 709/224; 709/235; 709/230
[58] Field of Search ........................ 395/200.49, 200.48, 395/200.65; 709/219, 218, 235, 230, 224

[56] References Cited

U.S. PATENT DOCUMENTS

| | | | |
|---|---|---|---|
| 5,706,434 | 1/1998 | Kremen et al. | 709/218 |
| 5,740,549 | 4/1998 | Reilly et al. | 705/14 |
| 5,802,292 | 9/1998 | Mogul | 709/203 |
| 5,835,087 | 11/1998 | Herz et al. | 345/327 |
| 5,872,926 | 2/1999 | Levac et al. | 709/206 |

OTHER PUBLICATIONS

Azer Bestavros; WWW Traffic Reduction and Load Balancing through Server–Based Caching; IEEE Concurrency; pp. 56 –67 Mar. 1997.

*Primary Examiner*—Kenneth R. Coulter

[57] ABSTRACT

A system for efficiently distributing computer data files to remotely located end users over a communications network, such as the Internet. A source server is maintained with all of the data files for use by the end users. Several local servers are connected to the source server and contain subsets of the data contained in the source server. Users connect to a local server and request a data file. If the file is located at the local server, it is provided by the local server without the need to contact the source server. If the file is not located at the local server, the source server is contacted by the local server in order to get the file for the user. The local server monitors data file usage and can update the data it maintains locally based upon the determined usage. Various management functions are used at the source and local servers to coordinate the file transfers and inventory table updating. Different communications protocols are used for the data transfers to enhance the security of the system from user access to data only available to servers.

20 Claims, 7 Drawing Sheets

FIG. 4

| FileID | FileLoc | FileTitle | CollectID | FileDate (MMDDYYYY) |
|---|---|---|---|---|
| file1.htm | /usr/local/app/file1.htm | Example File1 | LocalCol1 | 01221995 |
| file2.pdf | blue.st1.ibm.com/usr/local/app/file2.pdf | Example File2 | RemoteCol1 | 10081996 |
| file3.htm | http://www.ibm.com/software/file3.htm | Example File3 | WebCol1 | 10121996 |
| file4.htm | /usr/local/app/appl/file4.htm | Example File4 | LocalCol1 | 02181995 |
| ..... | ..... | ..... | ..... | ..... |

FIG. 6

| FileID | RefFileID | RefFileFormat | RefFileLoc |
|---|---|---|---|
| file1.htm | picture1.gif | gif | /usr/local/app/picture1.gif |
| file1.htm | picture2.jpg | jpg | /usr/local/app/picture2.jpg |
| file2.htm | doc1.pdf | pdf | blue.st1.ibm.com/usr/local/app/doc1.pdf |
| file4.htm | vedio1.wav | wav | /usr/local/app/vedio1.wav |
| ..... | ..... | ..... | ..... |

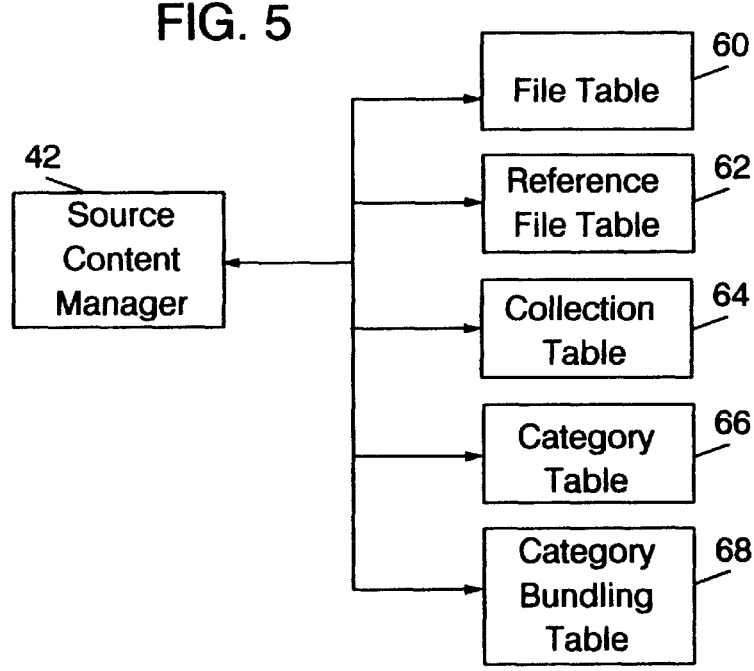
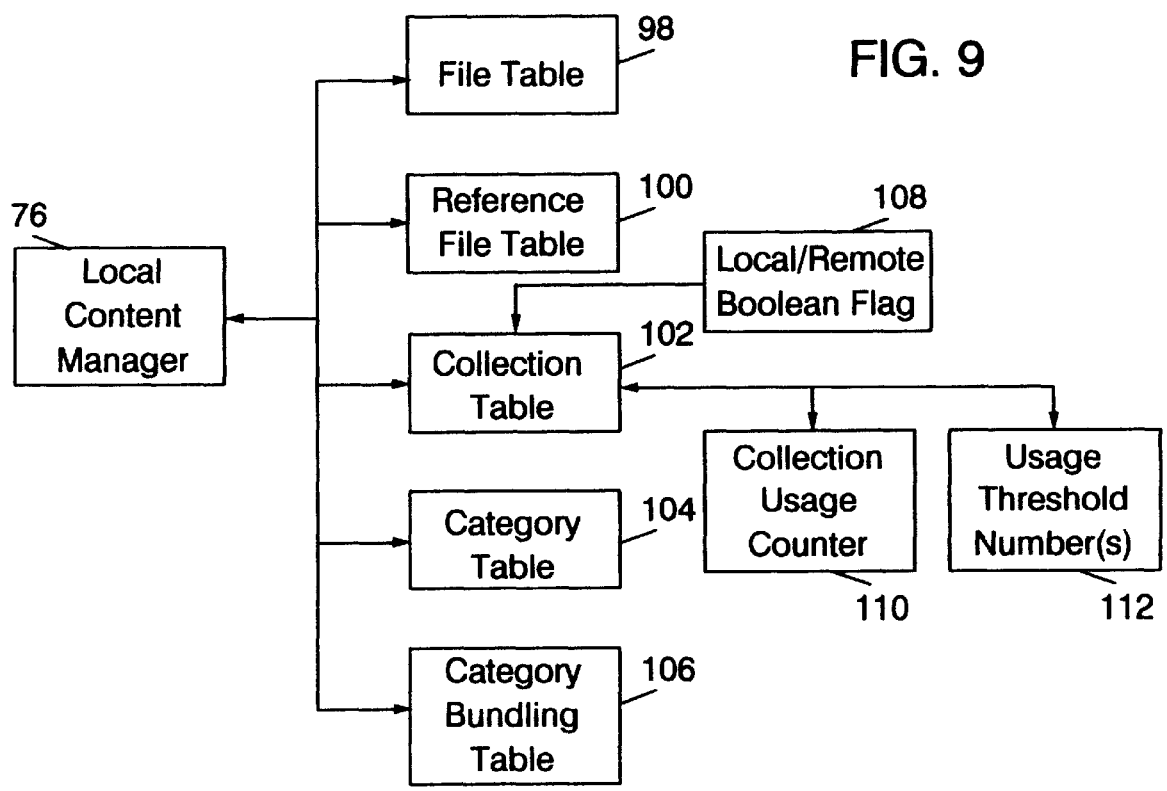

FIG. 7

| CollectID | ColTitle | ColLoc | ColDate (MMDDYYYY) | ColParentID | ColTerm |
|---|---|---|---|---|---|
| LocCol1 | Local Collection1 | /usr/local/app/app1 | 02221996 | AppCol1 | 1 |
| LocCol2 | RemoteCollection1 | /usr/local/app/app2 | 05081996 | AppCol1 | 1 |
| AppCol1 | Application Collection1 | /usr/local/app | 06101996 | SoftCol1 | 0 |
| ...... | | | | | ...... |

FIG. 8

| LocalServer | LocCol1 | LocCol2 | LocCol3 | RemoteCol1 | |
|---|---|---|---|---|---|
| blue.ibm.com | 1 | 1 | 0 | 0 | ...... |
| red.ibm.com | 0 | 0 | 0 | 1 | ...... |
| green.ibm.com | 0 | 0 | 1 | 0 | ...... |
| ...... | | | | | ...... |

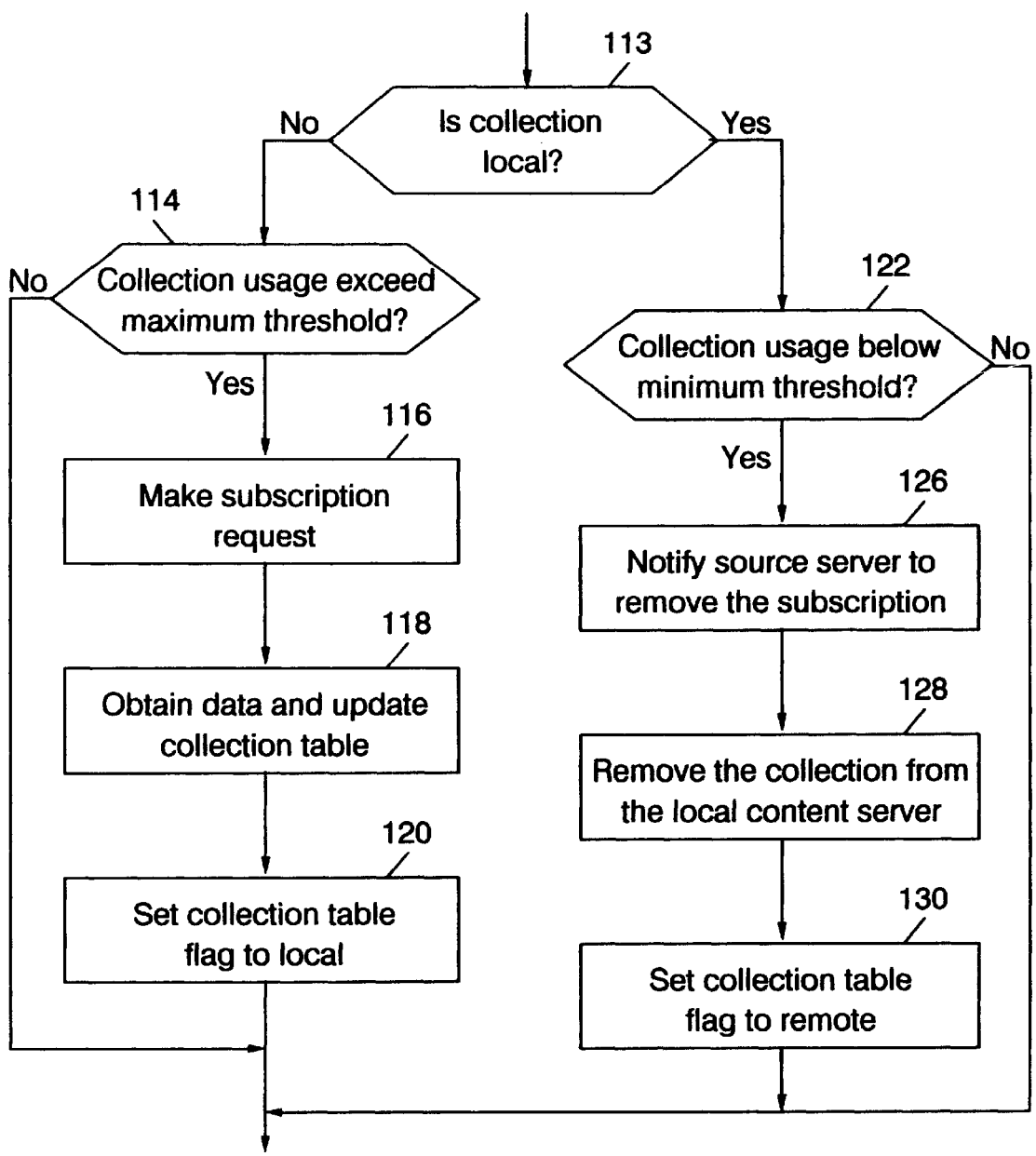

TWO-LEVEL CONTENT DISTRIBUTION SYSTEM

BACKGROUND OF THE INVENTION

1. Field of the Invention

This invention relates, in general, to computer systems and, more specifically, to content distribution of data information to remote computer users.

2. Description of the Prior Art

Distribution of information by digital data is becoming common with advances in computer and telecommunications network technologies, especially the Internet and the World Wide Web (WWW). The data transmitted over the network can represent various types of information, including text, graphics, image, video, and voice (so called multimedia data). The multimedia data can be in both static files and in executable files, and both types are included herein when "files" are specified. Since these multimedia data files are usually large, it requires a considerable amount of time to retrieve and transmit them over the network from a data content server to end users. Also, since a large number of users are usually involved when the network is the Internet, time responsive and efficient content delivery is critical for satisfactory Internet and web services. Thus, it is desirable, and an object of this invention, to provide a system with a new architecture which enhances the speed and efficiency of multimedia data content distribution.

One type of data content distribution becoming increasingly popular is that of publishers distributing their published works online over a suitable communications network, such as the World Wide Web (WWW) on the Internet. This has certain advantages to both the user and the publisher over fixed hard-copy distribution methods, and even over some more modern digital methods like CD-ROM. However, traditional methods of implementing data file distribution over the WWW does not lead to the efficiency desired for these types of materials. Compared to many other types of data files, publisher's data files have "well-composed contents," meaning that the contents is relatively mature and does not need frequent changes made in the files. The data files containing the contents of current books, journals, magazines, reports, newspapers, etc., would be examples of well-composed contents files. After going through the editorial process and being stored for distribution, their contents rarely needs to be changed.

According to existing prior art techniques, data files for distribution to remote computer users are usually located at a specific computer site, or source server. When any user on the system to which the server is connected wants to access or download a data file, the data is sent from the server to the user, over the communications network and through any intermediate servers. One difficulty with these systems is that when users are distant from the content server, such as is the case with global services to different geographical areas, the latency of data transmission time is a factor in satisfactory performance. Also, with such a system, there is an increase in network load which possibly slows down other services. On the other hand, users in a corporate LAN environment need to go through a gateway to reach remote servers. The gateway becomes a bottle-neck for performance. Therefore, it is desirable, and it is an object of this invention, to provide a content distribution system which maximizes access speed for remote users, reduces network load, and provides high speed accessibility for LAN environment users in reaching outside servers.

The system of this invention uses a combination of a central or global server and multiple local servers to implement the invention in a way that uses the well-composed nature of the data to advantage in preserving the resources of the network. Some prior art references have also used multiple level networks to carry out some of their objectives. European Patent Application, number 91301187.0, publication number 0 447 038 A2, published on Sep. 18, 1991, titled "A System for Establishing a Communication Path in a Closely Coupled Computer System" discloses a system wherein different levels of servers are used. The disclosure teaches a global server coupled to several local servers by a communications path. However, this system is structured for message communications in a closely coupled computer system, not for efficient data file distribution between a global server and many end users over a network as open as the Internet. One of the primary functions of the system described in the referenced application is to use a destination intermediation unit (11) to aid in the process of establishing a communication path which insures security of the message being delivered.

European Patent Application, number 93301715.4, publication number 0 615 362 A1, published on Sep. 14, 1994, titled "Network Analysis Method" discloses an analysis method wherein, what it describes as local and global servers, are identified. The method involves processing traffic data by removing traffic associated with nodes identified as acting as global servers, and using the remaining traffic to identify nodes acting as local servers. Upon the local servers being identified, the network analysis method carries out further processing to make suggestions as to whether any local servers should be moved to another segment or whether a segment should be split. While this technique may provide some important analysis methods to enhance and/or control a multi-level network system, it does not present the many features of the present invention which utilize a two-level arrangement of servers to perform an improved system of data file distribution to remote users.

SUMMARY OF THE INVENTION

There is disclosed herein a new and useful system and method for efficiently distributing well-composed data to remotely located, computer system end users. The system includes a source server at which all the data available to the end user is stored. The source server includes a data loader, a data content manager, data search and retrieval components, and an interface to allow data to be loaded into the server's repository and for monitoring and control of its functions by a system administrator. Such loading of the data separates the distribution system from the data creation system. This enables the distribution system of this invention to be operated at maximum performance. Several management components at the source server handle data and search requests originating from an end user or an associated local server. Such local servers are connected to the source server over a communications network using a communications protocol which is not available to the end user, thereby enhancing the security of the communications between the source and local servers.

In operation, the end users are connected to a local server in order to access the desired data file(s). Since the data supported by this system is well-composed and not usually changing very often, much of the data that end users will be looking for is contained at the local server. This allows the local server to satisfy the request for data without having to contact the source server and load the network with source to local data transfers. However, when the data is not available locally, the local server is able to contact the source server and obtain the data for the end user when it is requested.

Data stored at the local servers are collections of data files that the local servers subscribed from the source server. Initial subscriptions can be based on various factors, such as location, type of local server, user profiles, standard subscriptions, etc. After the initial subscription, usage at the local server determines the data collections which are to be stored at the local server site. The minimum subscription unit is a collection, and it is assumed that similar files are in a collection. The local server maintains a means for determining the number of times each data file collection has been used, or accessed. When the number exceeds a predetermined value over a predetermined amount of time, and the data file collection is not already stored at the local server, the local server initiates a subscription request to the source server for the collection. The local and source servers then communicate to update the subscriptions by transferring new data and updating the tables and listings of what is available and stored at each location. When the usage number of a collection is below a predetermined value over a known period of time, the local server may decide that it does not need to store that data locally and initiates a procedure of communications between the local and source servers to stop subscription of the collection, update the records and tables, and delete the collection from the local server.

The communications schemes can be different between the two server levels and between the local servers and the end users. For example, these could be the TCP/IP protocol between the servers, and the HTTP protocol for the end users.

BRIEF DESCRIPTION OF THE DRAWINGS

Further advantages and uses of this invention will become more apparent when considered in view of the following detailed description and drawings, in which:

FIG. 4 is an example of a file table as may be used by the source content manager;

FIG. 5 is a diagram used to illustrate some of the tables used by the source content manager;

FIG. 6 is an example of a reference file table as may be used by the source content manager;

FIG. 7 is an example of a collection table as may be used by the source content manager;

FIG. 8 is an example of a local server subscription matrix as may be used by the source content manager;

FIG. 9 is a diagram used to illustrate some of the facilities used by the local content manager;

FIG. 10 is a flow chart illustrating the process used to determine when a subscription request is to be made.

DETAILED DESCRIPTION OF THE PREFERRED EMBODIMENTS

Figure 1:
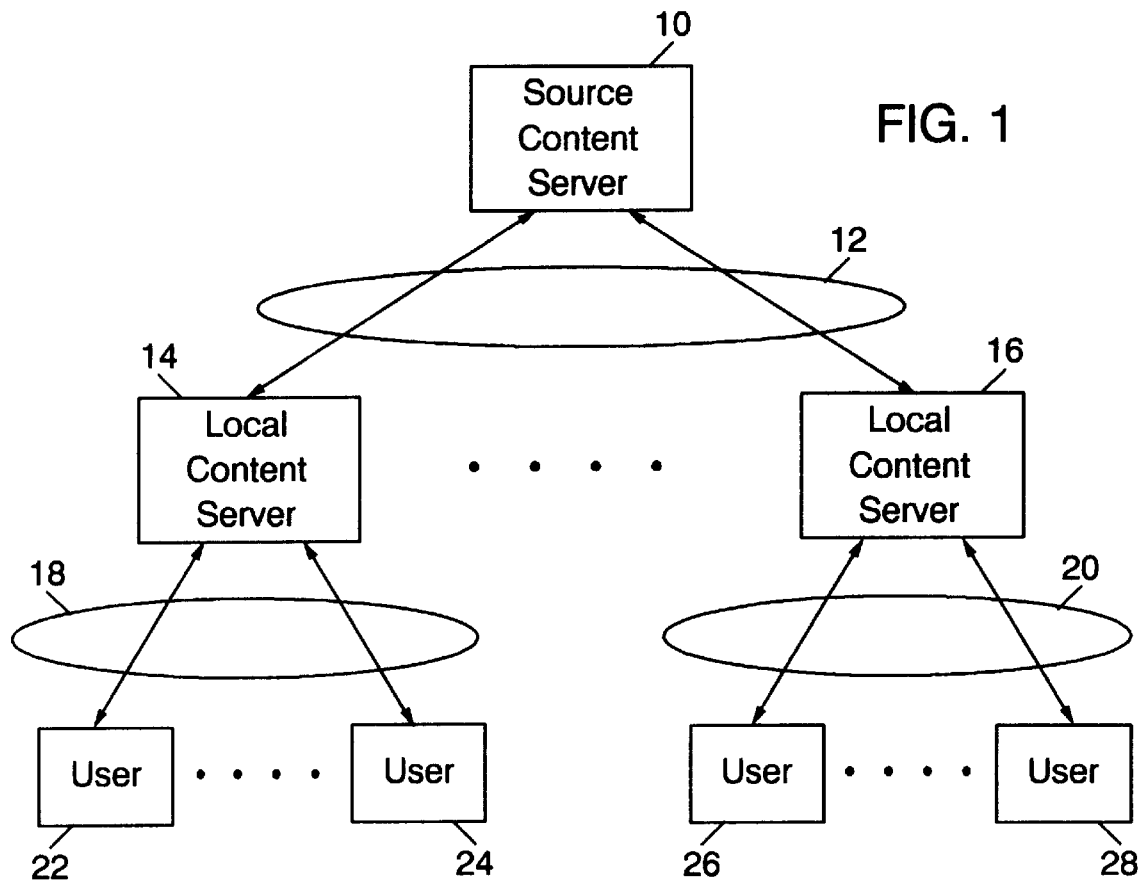
FIG. 1 is a block diagram of the environment in which the present invention functions, according to one specific embodiment.

Throughout the following description, similar reference characters refer to similar elements in all of the figures of the drawings.

Referring now to the drawings, and to FIG. 1 in particular, there is shown a block diagram of the environment in which the present invention functions. The source content server 10 is connected over the communications network 12 to a plurality of local content servers 14 and 16. (These servers are also sometimes referred to herein as simply the source server 10 and the local servers 14 and 16). The communications network 12 can be any communication network system which allows the source and local servers to communicate with each other and exchange data. The local servers 14 and 16 are connected over the communications networks 18 and 20 to the end users 22, 24, 26 and 28 as illustrated. The users 22–28 would typically be remotely located from the other components of the system and may be separate workstations or computer systems. It should be understood that in actual operation, many more local servers and end users than illustrated would be serviced by the source content server 10.

The networks 18 and 20 may be the same as the network 12, or may be different. For example, communications may be by use of the Internet system between all of the components of the content distribution system, or networks outside the Internet, such as LAN's or other dedicated networks, may be used for portions of the network communications interconnecting the servers and users. As will be described in more detail later, the scheme, or protocol, of communicating between the various components is important in the operation of this invention. Individual users 22–28 are allowed to communicate with the local servers 14 and 16, but not with source server 10. If all of the communications is taking place across the Internet, different protocols must be used to assure the proper level of access between the system components. In this regard, the communications network 12 would be functioning under the TCP/IP protocol, whereas the networks 18 and 20 would be functioning under the HTTP protocol. Other protocols can be used within the contemplation of the invention. As is well known by those skilled in the art, such a protocol arrangement makes the communications between the source and local servers more secure since the source server cannot be contacted directly by the end users.

In operation, the source content server 10 contains all of the data which is ultimately desired by one or more of the users 22–28. Based upon usage patterns, the local servers 14 and 16 contain subsets or portions of the overall data contained in the source server 10, thereby allowing the users to access that data without the need to communicate directly with the source server 10. The local servers 14 and 16 monitor the usage requests from their users and periodically update the data they contain based upon the observed usages. In other words, if the local server finds that some files are frequently being requested that it does not contain (and has to forward the request to the source server 10), a subscription request is generated by the local server to get the frequently requested file data for storage in the local server. By periodically updating its files based upon usages, the local servers can handle most file requests without the need to contact the source server and reducing the communications overhead resulting in such contacts.

Figure 2:
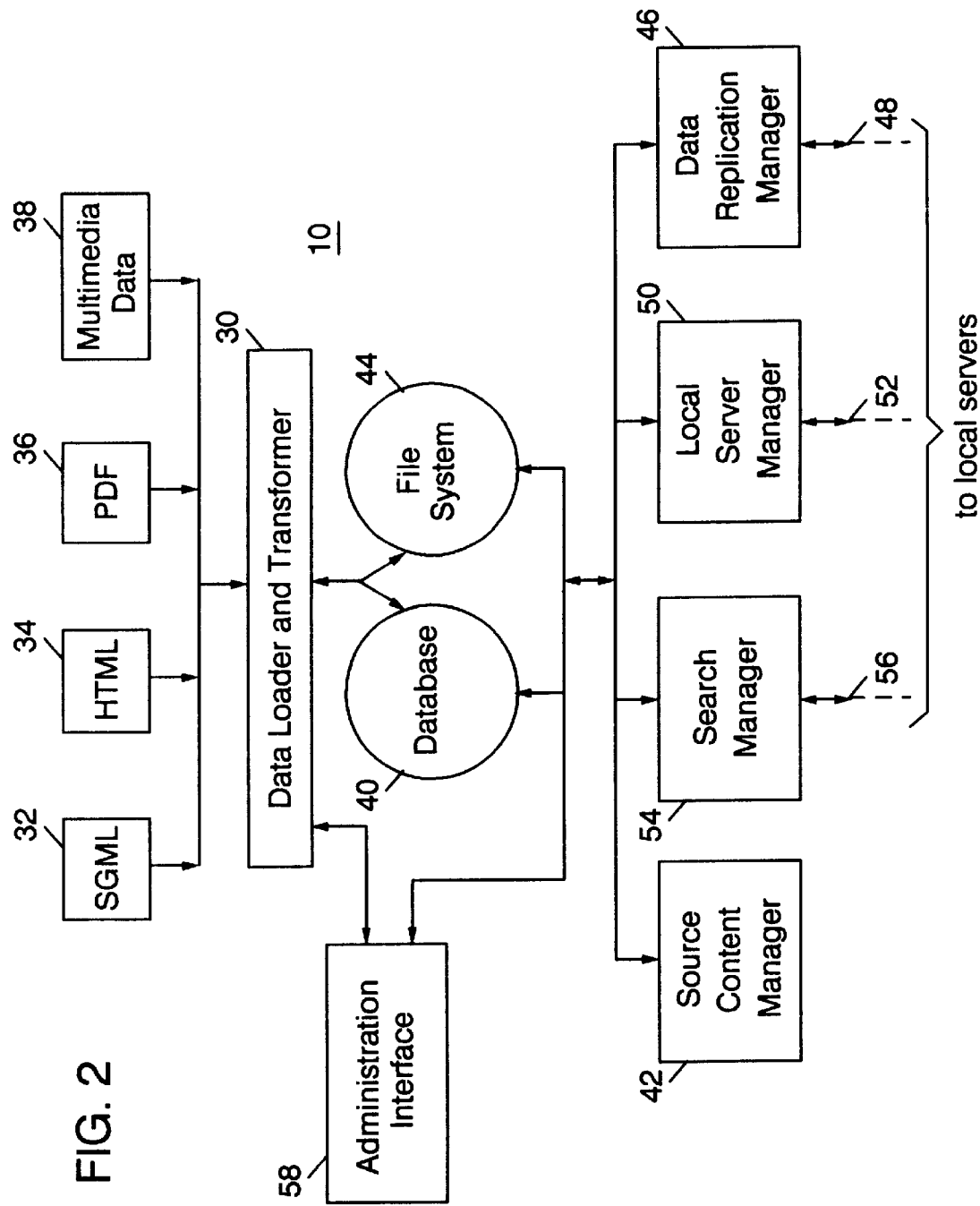
FIG. 2 is block diagram illustrating some major functional systems at the source content server.
Figure 3:
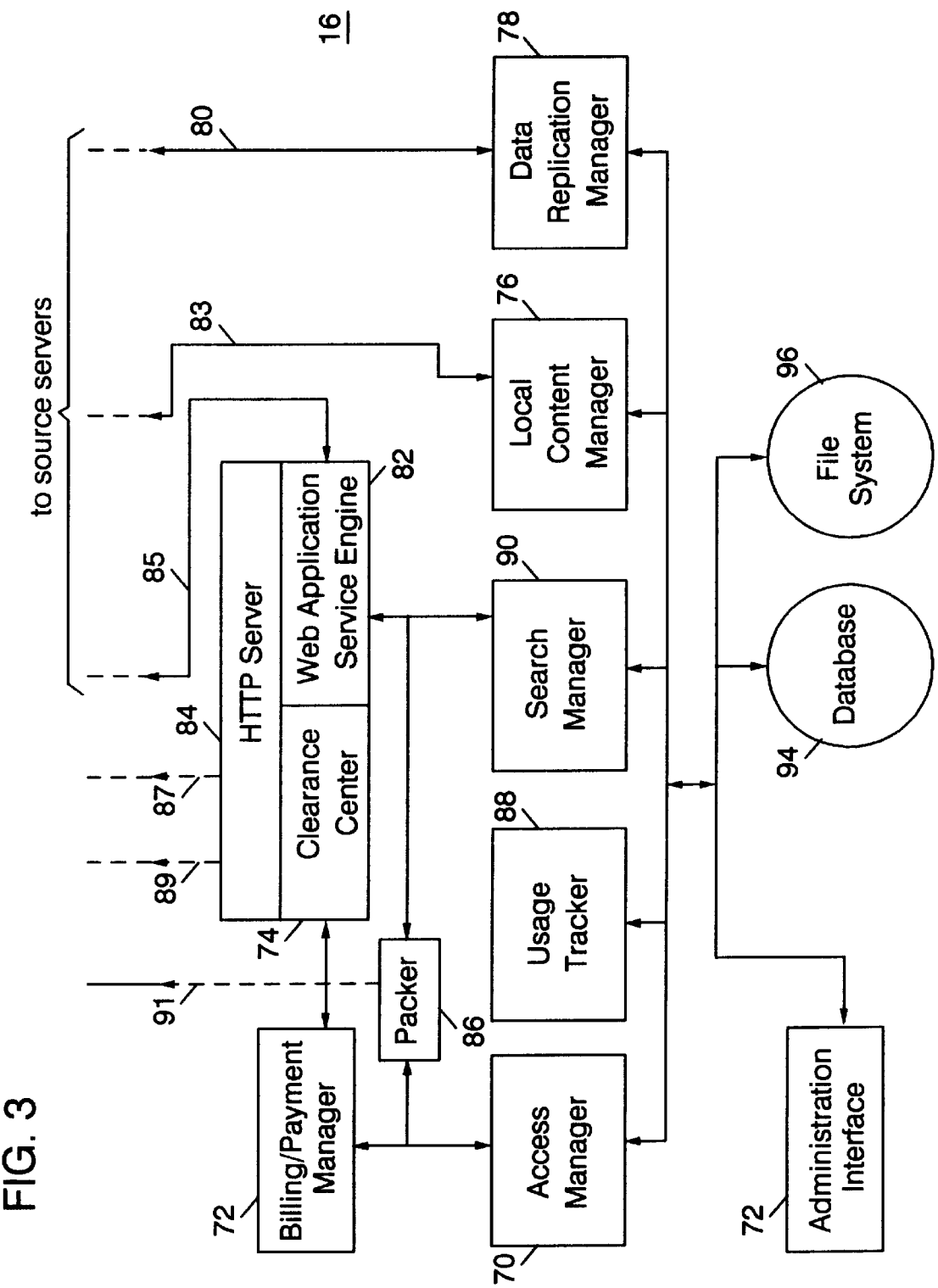
FIG. 3 is a block diagram illustrating some major functional systems at a local content server.

More detail about the source content server 10 and the local content servers 14 and 16 is shown in FIGS. 2 and 3, respectively. Referring to FIG. 2, the source content server 10 includes a data loader and transformer 30 which accepts the data which is to be contained at the source server. For purposes of describing this embodiment in an actual application, the data will be similar to that which can be used to distribute published information, such as a book, report, or journal. It should be understood that other forms of data may be distributed by using this invention. According to the described publishing system, data files in the SGML, HTML, and PDF formats can be created and transferred to the data loader and transformer 30. Such files are indicated by blocks 32, 34 and 36 in FIG. 2. These files, separately or in combination with multimedia data 38, provide the content which is stored in the source server 10. A relevant multimedia data file is referenced by other HTML or SGML files, and is not separately indexed nor is it independently retrievable. For each independent multimedia file or PDF file, a HTML file is created and indexed which provides a reference to the multimedia file for its retrieval. All independently retrievable content files are parsed with indexes that are stored in the database 40, and the actual contents of the files are transformed into HTML files by the loader and transformer 30 which functions according to usual methods for accomplishing these results according to techniques well known to those skilled in the art.

The source content manager 42 organizes and indexes the parsed contents for efficient retrieval. It uses the database 40 and the file system 44 to manage the central data source, or source content server 10. Each searchable file is a file with index information and has an entry in a central catalog contained in the database 40. The files are managed by collections, and are organized by categories. A collection is associated with a directory in the file system 44. The collection hierarchy can be mapped to the directory hierarchy.

A file in a collection defines its physical location. Each collection has a meaningful title. Viewing the collection through a user navigation interface provides the user with the variety and physical organization information about the documents or files in the distribution system. The collections can be expanded to several different server hardware units due to the open and scaleable nature of the system.

A category provides a logical group of similar documents defined by a given criteria, and the category hierarchy is defined by certain logical criteria. The criteria can be either extracted from files or created by human knowledge of the relationships between the files. The category bundling is independent of the physical locations of the files. The files are dynamically bundled into categories and sub-categories. Each file can be in multiple categories and/or sub-categories. More detail about category bundling for content distribution is disclosed in U.S. patent application, Ser. No. 08/877,014, filed on Sep. 9, 1997, titled "Multi-Level Category Dynamic Bundling for Content Distribution" and assigned to the same assignee as the present invention.

The data replication server 46 (FIG. 2) replicates data to the local servers based upon the subscription profile for the local servers. The minimum subscription unit is the lowest level collection. Path 48 symbolically represents the connection between the data replication manager 46 and the associated functional element at the local servers. The local server manager 50 manages the subscription profiles for the local servers, and path 52 symbolically provides this connection. The manager 50 also handles subscription requests from the local servers. The search manager 54, through the path 56, responds to full text search requests from the local servers whenever a full text search request from a user client is beyond the scope that the local server can provide. The administration interface 58 provides the means to maintain a level of control over the input, output, and storage systems of the source server 10. The interface 58 allows changing the system functions, monitoring for proper and/or fault conditions, observing system usage, and other desired administrative functions. It also allows the system administrators to organize the content files into collections and categories.

The source content manager 42 manages the data contents of the source content server 10. For purposes of this description, we assume that the contents are in the form of HTML files plus relevant multimedia data files. These are stored in the file system 44. A general catalog is designed that contains all of the content files, and this is called the file table. Each HTML file has an entry in the file table for search and content organization purposes. A typical file table contains the file's identifier, its location, title, publication date, collection it belongs to, and other index fields. The files are stored in a local or remote file system, and can be extended to contain files located on the WWW. If a file is in the local or remote file system, its full path name is used as its location. If a file is located on the WWW, its location is its URL. An example of some typical entries in a file table is shown by FIG. 4.

FIG. 5 illustrates the major data components serviced by the source content manager 42. The file table just described is shown as file table 60. The reference file table 62 is also associated with the content manager 42. The reference file table 62 stores information about multimedia reference files for the HTML files. These reference files are not searchable by themselves. Usually, they are placed in the same directory as the HTML files that reference them, though references from other directories are also possible. There is an entry for each reference file to each HTML file in the table. The table is described by the HTML file identifier, the reference file identifier, the reference file format, and the reference file location. An example of some typical entries in a reference file table is shown by FIG. 6.

The collection table 64 of FIG. 5 is a table containing collections of files which can be distributed to local servers. The collection table consists of a collection identifier, title, physical location, creation date, parent collection identifier, and a terminate flag. A collection identifier is uniquely assigned to each collection. A collection is a terminate collection if it contains content files. For that reason, a collection is a terminate collection if and only if its identifier appears in the CollectID column of the file table (FIG. 4). An example of some typical entries in a collection table is shown by FIG. 7.

The category table 66 and the category bundling table 68 shown in FIG. 5 are similar to the tables shown in more detail in the previously referenced patent application "Multi-level Category Dynamic Bundling for Content Distribution."

Referring back to FIG. 2, the local server manager 50 maintains a profile for each local server in a local server profile table, which is stored in the database 40. The profile information includes the local server's name, IP address, geographical location, and scheduled maintenance time. The local server manager 50 maintains the subscriptions from local servers in a two dimensional table, called a local server subscription matrix. The subscription unit is the terminate (lowest level) collections. FIG. 8 shows an example of some typical entries in a local server subscription matrix. Each local server has a row entry in the matrix that indicates to which collections it has subscribed. Each terminate collection takes a column in the subscription matrix. If a local server subscribed to the collection x, the cross entry of this local server and the collection x is set to 1, otherwise the cross entry is 0. After accepting a subscription request from a local server, the local server manager 50 will create an entry in the local server subscription matrix. When a new collection is created, the initial subscriptions for the local servers can also be done through the administration interface 58 by the source content server administrator.

The data replication manager 46 performs data replication based upon profile information for each local server in the system and the subscription information in the local server subscription matrix. When any management table, collection, or content file update occurs in the source server, the source content manager 42 will send a message to the data replication manager 46 to start a data replication. The data replication manager 46 then controls the process whereby the data is copied from the source server to the local server(s). This can also be done on a scheduled basis instead of automatically as described above. Or, as another alternative, it can be triggered manually from the administration interface at the source server. Therefore, there service modes are selectable for data replication during service operation.

FIG. 3 is a block diagram illustrating some major components at a local content server, such as servers 14 and 16 shown in FIG. 1. The local content servers are located in a local geographical area or a LAN environment of the user's workstations. Each local content server maintains a subset of the content in the source content server, although they have a complete copy of the general catalog and full content index information, which includes collection and category information. Thus, all of the content data in the source server can be searched from the local server by using an index search or organized content navigation. A full text search is usually limited to the content in the local server, however a full text search of the data in the source server can be triggered separately.

The local content servers are implemented behind HTTP or IIOP servers that provide interfaces to the WWW and enable client workstations to retrieve data by means of web browsers. Access control and secure data retrieval mechanisms are applied to both levels of the data retrieval system. Between the source and local content servers, the communications is based upon TCP/IP protocol, whereas the HTTP protocol (and others, like IIOP) is used between a local content server and a workstation, or user computer system. Since data access between the two different levels of servers is considered as system internal, user authentication and rights management facilities are implemented only at the local server level.

Each customer to the system needs to be registered, and a user profile is created accordingly for user authentication and access control purposes. These functions are performed by the access manager 70 shown in FIG. 3. The services can be subscription based (usually a fixed fee for a predetermined time or unlimited time) or transaction based (fee based on the particular transaction). For subscription based services, the access manager 70 periodically sends user subscription information to the billing/payment manager 72 for the service charges, or fees. For transactional based services, the billing/payment manager 72 is triggered from a cryptolope clearance center 74 when the user decides to view the selected content. More detail about user authentication and access control is disclosed in U.S. patent application, Ser. No. 08/926,027, filed on Sep. 9, 1997, titled "Concurrent User Access Control in Stateless Network Computing Service System," and assigned to the same assignee as the present invention.

Each local content server (FIG. 3) maintains a subset of the same content files in the source content server (FIG. 2). However, each local server has its own file table, reference file table, collection table, category table, and category bundling table. All of these tables are managed by the local content manager 76, which communicates through the path 83 with the local server manager 50 (FIG. 2). More detail about the local content manager 76 will be described in connection with FIG. 9. The data replication manager 78 (FIG. 3) is connected through the symbolic communications path 80 to the data replication manager 46 in FIG. 2. Usually, the data replication manager 78 in the local server 16 is in the continuous running mode. It accepts data replication requests from the data replication manager 46 in the source server. After receiving replicated data, it contacts the local content manager 76 to update the local content.

The web application service engine 82 enables dynamic content generation and distribution to the WWW. It serves as an interface between the HTTP server 84 (an IIOP server can be involved as well) and the underneath content retrieval services. For performance considerations, it is configured as a client/server application for itself. The client portion deals with web client requests and response. The sever portion generates data and sends it to the client. For scaleability consideration, the server portion can be operated in multiple instances and in one or more physical hardware systems. Path 85 communicates with path 56 shown in FIG. 2. Communications paths 87 and 89 provide symbolic connections to the communications network used by the workstations or user computers associated with this invention, and in this embodiment, is the Internet system.

One of the main objectives of the present invention is to retrieve almost all of the locally requested contents from the local content server. However, some rarely requested contents still need to be retrieved from the source content server. Cryptolope technology is used for secure content distribution and rights management. Cryptolope technology helps enforce an information provider's copyright by tracking the actions performed by an end user, and ensures that appropriate royalties are paid to the information provider. It also supports a super-distribution model that allows customers to legally redistribute the publisher's content and ensures that the content owner collects revenue from these subsequent users.

After a user selects a content file, the file will be sent to the packer 86 in the local server 16 from the local subdirectory or from the file system in the source server 10. The reference files will be retrieved by referring to the reference file table and will be packed together in the same cryptolope container. At the same time, the local content manager 76 will increase the collection usage counter value in the local collection table, with this process being illustrated by block 88. The cryptolope container will be sent to the user's client workstation. After browsing the abstract information and the terms and conditions, and if the user elects to open the cryptolope container, the decryption key will be sent from the clearance center to the client helper to open the container. If the user has requested transactional service, billing will be performed and the service completed. The usage tracker 88 can implement a transaction service monitor inside a clearance center. Also, various service logs can be implemented, and they can be turned on or off at any time. The packer 86 is connected to the Internet through the communications path 91. The search manager 90, administration interface 92, database 94, and file system 96 perform basically the same functions as their comparable elements in the source server.

FIG. 9 is a diagram illustrating some of the components of the local content manager 76 shown in FIG. 3. According to FIG. 9, the local content manager 76 manages a file table 98, a reference file table 100, a collection table 102, a category table 104, and a category bundling table 106, all located at the local server. The file table 98 in the local server contains the same data as the file table (FIG. 4) in the source server except that it has one more field. This extra field is a boolean flag that indicates whether the content file is in the local server or only in the source server. The source server's name and IP address are kept in a configuration file at the local server. The reference file table 100 is similar to the source reference file table (FIG. 6) with a similar extra boolean flag field to indicate source or local server for the file location. Usually, a reference file is located in the same directory as the file that references it.

The collection table 102 at the local server is similar to the collection table in the source server (FIG. 7) with the addition of a boolean flag 108 to indicate local or source location, plus extra fields for a collection usage counter 110 and usage threshold number(s) 112. There are two threshold numbers. One is the maximum threshold number, and the other is the minimum threshold number. The collection usage counter 110 registers the number of times the files in this collection have been retrieved. If the counter number is larger or smaller than the threshold number(s) 112, appropriate action is taken. If the number of file retrievals in a collection is larger than the maximum threshold number, the collection would be subscribed from the source server and stored in the local server. If the number of file retrievals in a collection is smaller than the minimum threshold number, the collection in the local server would be deleted, and the subscription stopped.

FIG. 10 illustrates, in flow chart form, the process used to update the file data stored at the local content server, according to this specific embodiment of the invention. First, the local content manager at the local server determines if the collection being surveyed is stored locally (block 113). If not, it then determines if the usage of the collection of data, not currently residing at the local server, exceeds a maximum threshold number (block 114) over a predetermined period of time. If so, the local server makes a subscription request (block 116) to the source server. In other words, if the data is being used frequently at this local server and it does not currently reside there, the local server sets the process in motion to obtain the data. Then, the data in the new subscription is obtained at the local server and the collection table is updated (block 118) to indicate the storage of the data at the local server. Once the data is obtained, the flags in the file table, the reference file table, and the collection table are set to indicate that the data is contained in the repository of the local server (block 120). If the usage of a particular collection of data does not exceed a maximum threshold number (block 114) over a predetermined period of time, no changes to the subscribed data at the local server are made.

When the collection has been found to be stored in the local server (block 113), a determination is made if the collection of data usage is below a minimum threshold value, or number (block 122). If not, no changes to the subscribed data at the local server are made. If so, the source server is notified to remove the local server subscription (block 126) from its local server subscription matrix. The data is then removed at the local content server (block 128) and the flag in the collection table is set to remote (block 130) to indicate that this particular collection of data is only available from the remote source server.

Figure 11:
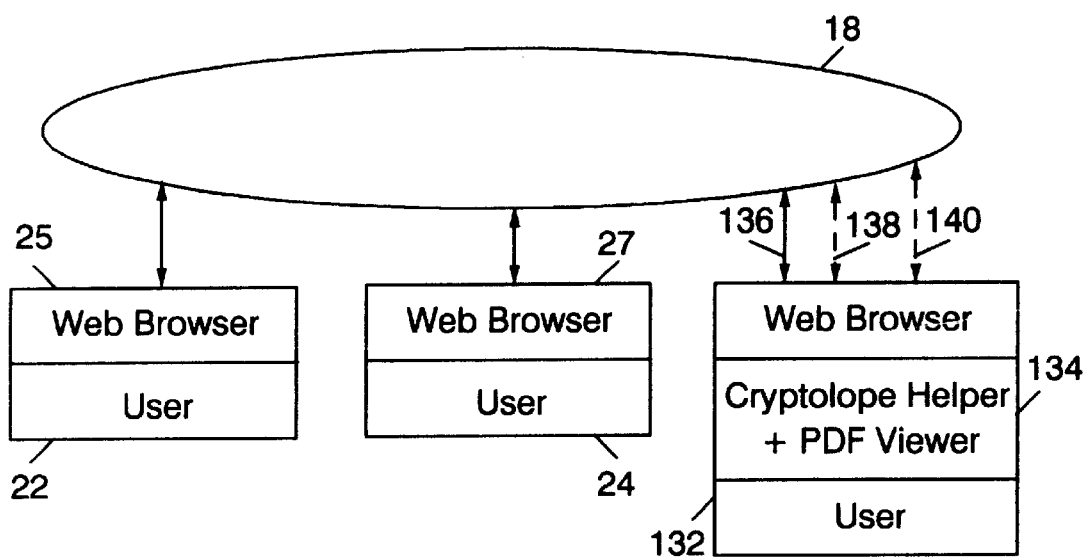
FIG. 11 is a diagram illustrating the end user portion of the distribution system.

FIG. 11 illustrates the end user portion of the distribution system. Communications network 18 in this specific embodiment is the Internet (or "Intranet" if a local area system is being used). End users 22 and 24 use web browsers 25 and 27, respectively, to communicate across the network 18. User 132 is shown in more detail, although all user systems may have the same capabilities as shown for user 132. Thus, each local user has a cryptolope helper and PDF viewer 134 to permit enhanced information usage from the local server, such as cryptolope container data and PDF data. For a complete system, the symbolic communications paths 136, 138 and 140 furnish the channels for interconnection to the appropriate system elements. In this specific embodiment, the path 136 leads to the general Internet network, the path 138 leads to path 91 shown in FIG. 3, and path 140 leads to path 89 also shown in FIG. 3.

It is emphasized that numerous changes may be made in the above-described embodiments without departing from the teachings of the invention. For example, the system user may locate the data contained in the source and local servers by conventional text and/or keyword searches, or by use of the interactive category searching as disclosed in the referenced patent application titled "Multi-level Category Dynamic Bundling for Content Distribution." In addition, the communications network connecting the source server to the local servers may be the same or different than the communications network interconnecting the end users with their respective local servers. For example, the Internet may be used for both networks. Or, the Internet may be used for the source-local server network communications and a LAN (Intranet) used for the user-local server network communications. Also, the data contained at the source and local servers may be both usable files and category data used for searching and navigation, or just a collection of usable files without any associated search/navigation data files. In addition, usage for subscription purposes may be based upon either individual files in a collection or upon the overall use of a collection of several files.

It is intended that all of the matter contained in the foregoing description, or shown in the accompanying drawings, shall be interpreted as illustrative rather than limiting.

Having thus described the invention, what is claimed is:

1. A system for the distribution of data files to a plurality of users, said system comprising:

a source server containing data files for distribution;

a plurality of local servers interconnected with the source server over a first communications network by a first protocol scheme;

means for interconnecting a plurality of users to each of said local servers over a second communications network by a second protocol scheme;

means, at each local server, for determining a usage pattern of the data files accessed by the users connected to that local server; and means, at each local server, for periodically updating which data files are stored in the local server, with said updating being based upon said determined usage pattern.

2. The data file distribution system of claim 1 wherein the first and second communications networks are the same.

3. The data file distribution system of claim 1 wherein the first and second protocol schemes are different.

4. The data file distribution system of claim 3 wherein the first protocol scheme is not available for use by the users in communicating with the source server.

5. The data file distribution system of claim 3 wherein the first protocol scheme is based on the TCP/IP protocol and the second protocol scheme is based on the HTTP and IIOP protocols.

6. The data file distribution system of claim 1 wherein the usage pattern is dependent, at least, upon whether a particular data file has been accessed by users of the local server more than a predetermined number of times over a predetermined period of time.

7. The data file distribution system of claim 1 wherein the usage pattern is dependent, at least, upon the whether a particular data file has not been accessed by users of the local server a predetermined number of times over a predetermined period of time.

8. The data file distribution system of claim 1 wherein the updating includes notifying the source server of different data files to store in the local server, and receiving said different data files for storage in the local server.

9. The data file distribution system of claim 8 wherein the updating also includes new category information for tables contained at the local server.

10. The data file distribution system of claim 1 wherein:
   the first protocol scheme is based on the TCP/IP protocol and the second protocol scheme is based on the HTTP and IIOP protocols;
   the usage pattern is dependent, at least, upon whether a particular data file has been accessed by users of the local server more than a predetermined number of times over a predetermined period of time;
   the updating includes notifying the source server of different data files to store in the local server, and receiving said different data files for storage in the local server; and
   the updating also includes new category information for tables contained at the local server.

11. A method of distributing data files to a plurality of users, said method including the steps of:
   storing a group of data files at a source server;
   storing at least one subgroup of data files at a plurality of local servers, with some local servers having different subgroups, and with a subgroup being a portion of the group of data files contained in the source server;
   interconnecting said source and local servers over a communications network by a first protocol scheme;
   interconnecting each of said local servers to a plurality of users over a communications network by a second protocol scheme;
   determining a usage pattern of data files accessed by users of a particular local server; and
   periodically updating which data file subgroups are stored in said particular local server based upon said determined usage pattern.

12. The data file distribution method of claim 11 wherein the first and second communications networks are the same.

13. The data file distribution method of claim 11 wherein the first and second protocol schemes are different.

14. The data file distribution method of claim 13 wherein the first protocol scheme is not available for use by the users in communicating with the source server.

15. The data file distribution method of claim 13 wherein the first protocol scheme is based on the TCP/IP protocol and the second protocol scheme is based on the HTTP and IIOP protocols.

16. The data file distribution method of claim 11 wherein the usage pattern is dependent, at least, upon whether a particular data file has been accessed by users of the local server more than a predetermined number of times over a predetermined period of time.

17. The data file distribution method of claim 11 wherein the usage pattern is dependent, at least, upon the whether a particular data file has not been accessed by users of the local server a predetermined number of times over a predetermined period of time.

18. The data file distribution method of claim 11 wherein the updating includes the steps of:
   notifying the source server of different data files to store in the local server; and
   receiving said different data files for storage in the local server.

19. The data file distribution method of claim 18 wherein the updating also includes receiving new category information for storage in tables contained at the local server.

20. A method of distributing data files to a plurality of users, said method including the steps of:
   storing a group of data files at a source server;
   storing at least one subgroup of data files at a plurality of local servers, with some local servers having different subgroups, and with a subgroup being a portion of the group of data files contained in the source server;
   interconnecting said source and local servers over the Internet communications network using the TCP/IP protocol;
   interconnecting each of said local servers to a plurality of users over the Internet communications network using the HTTP and IIOP protocols;
   determining, at a local server, whether a particular data file has been accessed by users of said local server more than a predetermined number of times over a predetermined period of time; and
   when it has been determined that said particular data file has been accessed more than said number of times and said data file is not resident in the local server;
   originating, at said local server, a request to the source server for a new subgroup of data files which contains said particular data file;
   receiving at said local server, in response to said request, a new subgroup of data files for storage at the local server; and
   also receiving at said local server, in response to said request, category information for storage in tables contained at the local server.

* * * * *